US008855851B2

(12) United States Patent
Nishizawa (10) Patent No.: US 8,855,851 B2
(45) Date of Patent: Oct. 7, 2014

(54) DIAGNOSING DEVICE FOR VEHICLE AND METHOD FOR DIAGNOSING VEHICLE

(75) Inventor: Jun Nishizawa, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/004,212

(22) PCT Filed: Apr. 13, 2011

(86) PCT No.: PCT/JP2011/059166
§ 371 (c)(1),
(2), (4) Date: Sep. 10, 2013

(87) PCT Pub. No.: WO2012/140748
PCT Pub. Date: Oct. 18, 2012

(65) Prior Publication Data
US 2014/0039754 A1   Feb. 6, 2014

(51) Int. Cl.
*G01M 17/00*   (2006.01)
*G07C 5/00*   (2006.01)
*F01P 11/14*   (2006.01)
*B60K 1/00*   (2006.01)

(52) U.S. Cl.
CPC ............ *G07C 5/00* (2013.01); *B60K 2001/003* (2013.01); *F01P 11/14* (2013.01)
USPC ...................................................... 701/29.5

(58) Field of Classification Search
None
See application file for complete search history.

(56) References Cited

U.S. PATENT DOCUMENTS

| 7,032,576 B2 * | 4/2006 | Linna et al. ............... 123/549 |
| 2004/0003801 A1 * | 1/2004 | Linna et al. ............... 123/549 |

FOREIGN PATENT DOCUMENTS

| JP | 07-324850 A | 12/1995 |
| JP | 2005-078974 A | 3/2005 |
| JP | 2007-048476 A | 2/2007 |
| JP | 2007-211671 A | 8/2007 |
| JP | 2007-247506 A | 9/2007 |

OTHER PUBLICATIONS

International Search Report of PCT/JP2011/059166 dated Jul. 19, 2011.

* cited by examiner

*Primary Examiner* — Thomas Tarcza
*Assistant Examiner* — Adam Alharbi
(74) *Attorney, Agent, or Firm* — Sughrue Mion, PLLC (57) ABSTRACT

A diagnosing device is provided for a vehicle having a flow passage for circulating a liquid medium for cooling an inverter of the vehicle, and a pump provided on the flow passage to circulate the liquid medium. The diagnosing device includes a temperature sensor for measuring a temperature related to a temperature of the liquid medium, and a calculating unit for calculating a concentration of the liquid medium. The calculating unit calculates a viscosity of the liquid medium based on a flow rate of the liquid medium flowing through the flow passage and performance of the pump, and when the calculation as to the viscosity of the liquid medium is executed with a plurality temperature conditions, the calculating unit calculates the concentration of the liquid medium based on a relationship between the plurality of temperature conditions and the corresponding viscosities of the liquid medium.

5 Claims, 8 Drawing Sheets

FALLING RATE - FLOW RATE MAP

DIAGNOSING DEVICE FOR VEHICLE AND METHOD FOR DIAGNOSING VEHICLE

CROSS REFERENCE TO RELATED APPLICATIONS

This is a National Stage of International Application No. PCT/JP2011/059166 filed Apr. 13, 2011, the content of all of which is incorporated herein by reference in its entirety.

TECHNICAL FIELD

The present invention relates to a diagnosing device for a vehicle and a method for diagnosing a vehicle, and more particularly to a diagnosing device for a vehicle and a method for diagnosing a vehicle involving calculation of a concentration of a coolant liquid medium of a vehicle.

BACKGROUND ART

Conventionally, in a cold region and the like, in order to prevent freezing of coolant water for cooling an internal combustion engine, an antifreeze liquid such as a long-life coolant (LLC) is mixed in the coolant water and used. Japanese Patent Laying-Open No. 2007-247506 (PTD1) discloses a method for detecting a concentration of an antifreeze liquid mixed in coolant water. According to this technology, antifreeze liquid concentration estimating means estimates a concentration of the antifreeze liquid based on a current value detected when a predetermined control is performed by pump controlling means in the case where a predetermined condition is satisfied.

CITATION LIST

Patent Document

PTD 1: Japanese Patent Laying-Open No. 2007-247506
PTD2: Japanese Patent Laying-Open No. 7-324850
PTD3: Japanese Patent Laying-Open No. 2005-78974
PTD4: Japanese Patent Laying-Open No. 2007-48476
PTD5: Japanese Patent Laying-Open No. 2007-211671

SUMMARY OF INVENTION

Technical Problem

According to the method for estimating a concentration disclosed in Japanese Patent Laying-Open No. 2007-247506 (PTD1), the concentration is estimated only with a current value of a pump. This method may involve deterioration of an estimation accuracy when a change occurs in a coolant system and/or a cooled subject. For example, external factors such as increase in water passing resistance of a flow passage due to changes over years, degradation of a motor as a cooled subject in the case of a hybrid vehicle, and excessive heat radiation of an inverter element may negatively affect the estimation accuracy.

An object of the present invention is to provide a diagnosing device and a method for diagnosing a vehicle capable of estimating a concentration of a coolant liquid medium with a high accuracy.

Solution to Problem

In summary, the present invention relates to a diagnosing device for a vehicle having a flow passage for circulating a liquid medium for cooling an inverter of the vehicle, and a pump provided on the flow passage to circulate the liquid medium, and the diagnosing device includes a temperature sensor for measuring a temperature related to a temperature of the liquid medium and a calculating unit for calculating a concentration of the liquid medium. The calculating unit calculates a viscosity of the liquid medium based on a flow rate of the liquid medium flowing through the flow passage and performance of the pump. When the calculation as to the viscosity of the liquid medium is executed under a plurality of temperature conditions, the calculating unit calculates the concentration of the liquid medium based on a relationship between the plurality of temperature conditions and the viscosity of the liquid medium.

Preferably, the calculating unit performs driving of the pump based on the calculated concentration of the liquid medium.

Preferably, the diagnosing device for a vehicle further includes an ambient temperature sensor for measuring an ambient temperature. The calculating unit outputs a warning when the calculated concentration of the liquid medium is included within a freezing concentration range corresponding to the ambient temperature.

Preferably, the calculating unit outputs a warning when the calculated concentration of the liquid medium is not included within the concentration range of a specified liquid medium.

According to another aspect, the present invention relates to a method for diagnosing a vehicle having a flow passage for circulating a liquid medium for cooling an inverter of the vehicle and a pump provided on the flow passage to circulate the liquid medium, and the method includes the steps of measuring a temperature related to a temperature of the liquid medium, calculating a viscosity of the liquid medium based on a flow rate of the liquid medium flowing through the flow passage and performance of the pump, and calculating a concentration of the liquid medium based on a relationship between a plurality of temperature conditions and corresponding viscosity of the liquid medium when calculation of the viscosity of the liquid medium is performed under the plurality of temperature conditions.

Advantageous Effects of Invention

According to the present invention, an accuracy for estimating a concentration of a coolant liquid medium is improved, and an accuracy of various related warnings and/or controls is also improved.

DESCRIPTION OF EMBODIMENT

In the following, an embodiment of the present invention will be described in detail with reference to the drawings. The same or corresponding parts in the drawings have the same reference signs allotted, and description thereof will not be repeated.

Figure 1:
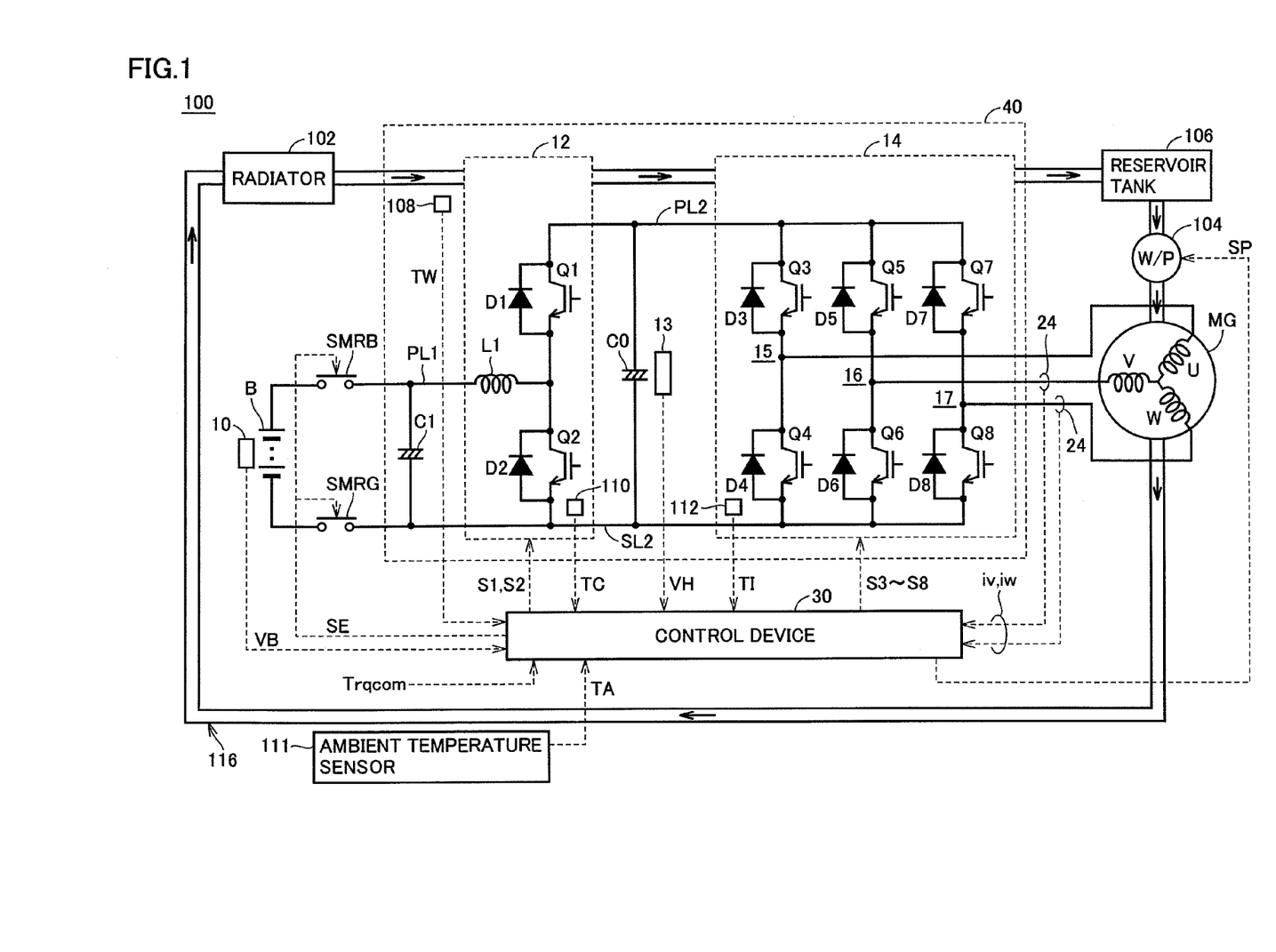
FIG. 1 represents a circuit diagram showing a configuration of a vehicle 100 provided with a coolant system of a vehicle.

FIG. 1 represents a circuit diagram showing a configuration of a vehicle 100 provided with a coolant system of a vehicle. Vehicle 100 is shown as an example of an electric vehicle. However, the present invention can be also applied to a vehicle other than an electric vehicle. In other words, it can be applied to a hybrid vehicle and a fuel cell vehicle using an internal combustion engine together as long as the vehicle is provided with a coolant system.

Referring to FIG. 1, vehicle 100 includes a battery B as a power storage device, a voltage sensor 10, a power control unit (PCU) 40, a motor generator MG, and a control device 30. PCU 40 includes a voltage converter 12, smoothing capacitors C1, C0, a voltage sensor 13, and an inverter 14. PCU 40 may include only inverter 14 without voltage converter 12. Vehicle 100 further includes a positive electrode bus line PL2 for supplying power to inverter 14 for driving motor generator MG.

Smoothing capacitor C1 is connected between a positive electrode bus line PL1 and a negative electrode bus line SL2. Voltage converter 12 boosts a voltage across terminals of smoothing capacitor C1. Smoothing capacitor C0 smoothes the voltage boosted by voltage converter 12. Voltage sensor 13 detects a voltage VH between terminals of smoothing capacitor C0 and outputs the voltage to control device 30.

Vehicle 100 further includes a system main relay SMRB connected between a positive electrode of battery B and positive electrode bus line PL1, and a system main relay SMRG connected between a negative electrode of battery B (negative electrode bus line SL1) and a node N2.

The conduction/non-conduction states of system main relays SMRB, SMRG are controlled in response to a control signal SE given by control device 30. Voltage sensor 10 measures a voltage VB between terminals of battery B. Although not illustrated in the drawings, a current sensor for detecting a current IB flowing into battery B is provided together with voltage sensor 10 to monitor a charging state of battery B.

For example, a secondary battery such as a lead storage battery, a nickel metal hydride battery, a lithium-ion battery, and the like, or a large volume capacitor such as an electric double layer capacitor may be employed as battery B. Negative electrode bus line SL2 passes through voltage converter 12 and extends to the side of inverter 14.

Voltage converter 12 is voltage converting equipment provided between battery B and positive electrode bus line PL2 to perform voltage conversion. Voltage converter 12 includes a reactor L1 having one end connected to positive electrode bus line PL1, IGBT elements Q1, Q2 connected in series between positive electrode bus line PL2 and negative electrode bus line SL2, and diodes D1, D2 connected in parallel respectively to IGBT elements Q1, Q2.

The other end of reactor L1 is connected to an emitter of IGBT element Q1 and a collector of IGBT element Q2. A cathode of diode D1 is connected with a collector of IGBT element Q1, and an anode of diode D1 is connected with an emitter of IGBT element Q1. A cathode of diode D2 is connected to the collector of IGBT element Q2, and an anode of diode D2 is connected to an emitter of IGBT element Q2.

Inverter 14 is connected to positive electrode bus line PL2 and negative electrode bus line SL2. Inverter 14 converts a direct-current voltage outputted by voltage converter 12 into a three-phase alternate current voltage and outputs the voltage to motor generator MG for driving wheels 2. Further, with regenerative braking, inverter 14 returns power generated by motor generator MG to voltage converter 12. In this stage, voltage converter 12 is controlled by control device 30 so as to operate as a step-down circuit.

Inverter 14 includes a U-phase arm 15, a V-phase arm 16, and a W-phase arm 17. U-phase arm 15, V-phase arm 16, and W-phase arm 17 are connected in parallel between positive electrode bus line PL2 and negative electrode bus line SL2.

U-phase arm 15 includes IGBT elements Q3, Q4 connected in series between positive electrode bus line PL2 and negative electrode bus line SL2, and diodes D3, D4 connected in parallel respectively to IGBT elements Q3, Q4. A cathode of diode D3 is connected to a collector of IGBT element Q3, and an anode of diode D3 is connected to an emitter of IGBT element Q3. A cathode of diode D4 is connected to a collector of IGBT element Q4, and an anode of diode D4 is connected to an emitter of IGBT element Q4.

V-phase arm 16 includes IGBT elements Q5, Q6 connected in series between positive electrode bus line PL2 and negative electrode bus line SL2, and diodes D5, D6 connected in parallel respectively to IGBT elements Q5, Q6. A cathode of diode D5 is connected to a collector of IGBT element Q5, and an anode of diode D5 is connected to an emitter of IGBT element Q5. A cathode of diode D6 is connected to a collector of IGBT element Q6, and an anode of diode D6 is connected to an emitter of IGBT element Q6.

W-phase arm 17 includes IGBT elements Q7, Q8 connected in series between positive electrode bus line PL2 and negative electrode bus line SL2, and diodes D7, D8 connected in parallel respectively to IGBT elements Q7, Q8. A cathode of diode D7 is connected to a collector of IGBT element Q7, and an anode of diode D7 is connected to an emitter of IGBT element Q7. A cathode of diode D8 is connected to a collector of IGBT element Q8, and an anode of diode D8 is connected to an emitter of IGBT element Q8.

Motor generator MG is a three-phase permanent magnet synchronous motor, and each one end of three stator coils of U-phase, V-phase, and W-phase is connected to a neutral point. Then, the other end of a U-phase coil is connected to a line drawn from a connection node of IGBT elements Q3, Q4. Further, the other end of a V-phase coil is connected to a line drawn from a connection node of IGBT elements Q5, Q6. Furthermore, the other end of a W-phase coil is connected to a line drawn from a connection node of IGBT elements Q7, Q8.

Current sensor 24 detects a current flowing into motor generator MG as a motor current value MCRT and outputs motor current value MCRT to control device 30.

Control device 30 receives a rotational speed of motor generator MG, each value of current IB and voltages VB, VH, motor current value MCRT, and an activation signal IGON. Control device 30 controls voltage converter 12 and inverter 14 based on these information.

Particularly, a control signal PWU for a boosting instruction with respect to voltage converter 12, a control signal PWD for a stepping-down instruction, and a shut-down signal instructing prohibition of operation are outputted.

Further, control device 30 outputs a control signal PWMI for providing a driving instruction to inverter 14 to convert a direct-current voltage as an output of voltage converter 12 into an alternate-current voltage for driving motor generator MG, and a control signal PWMC for providing a regeneration instruction of converting the alternate-current voltage generated by motor generator MG into a direct-current voltage and return the voltage to the side of voltage converter 12.

[Description of Coolant System]

Referring back to FIG. 1, vehicle 100 includes a radiator 102, a reservoir tank 106, and a water pump 104, as a coolant system for cooling PCU 40 and motor generator MG.

Radiator 102, PCU 40, reservoir tank 106, water pump 104, and motor generator MG are connected in series and in a circular pattern by a flow passage 116.

Water pump 104 is a pump for circulating coolant water such as an antifreeze liquid. Radiator 102 receives coolant water, which has cooled voltage converter 12 and inverter 14 provided PCU 40, from flow passage 116 and cools the received coolant water with use of a radiator fan not illustrated in the drawings.

Near a coolant water inlet of PCU 40, a temperature sensor 108 for measuring a coolant water temperature is provided. A coolant water temperature TW is transmitted from temperature sensor 108 to control device 30. Further, a temperature sensor 110 for detecting a temperature TC of voltage converter 12 and a temperature sensor 112 for detecting a temperature TI of inverter 14 are provided in PCU 40. A temperature detecting element and the like provided in an intelligent power module are employed as temperature sensors 110, 112.

Vehicle 100 further includes an ambient temperature sensor 111 for measuring an ambient temperature. Control device 30 receives an ambient temperature measurement value from ambient temperature sensor 111. Then, control device 30 generates a signal SP for driving water pump 104 based on an ambient temperature measurement value, temperature TC from temperature sensor 110, and temperature TI from temperature sensor 112 and outputs generated signal SP to water pump 104.

According to the configuration shown in FIG. 1, temperature sensor 112 is used to detect a coolant water flow rate which has not been detected conventionally or exhibited a low estimation accuracy. Detecting the flow rate can improve an accuracy in estimating a concentration of coolant water.

Figure 2:
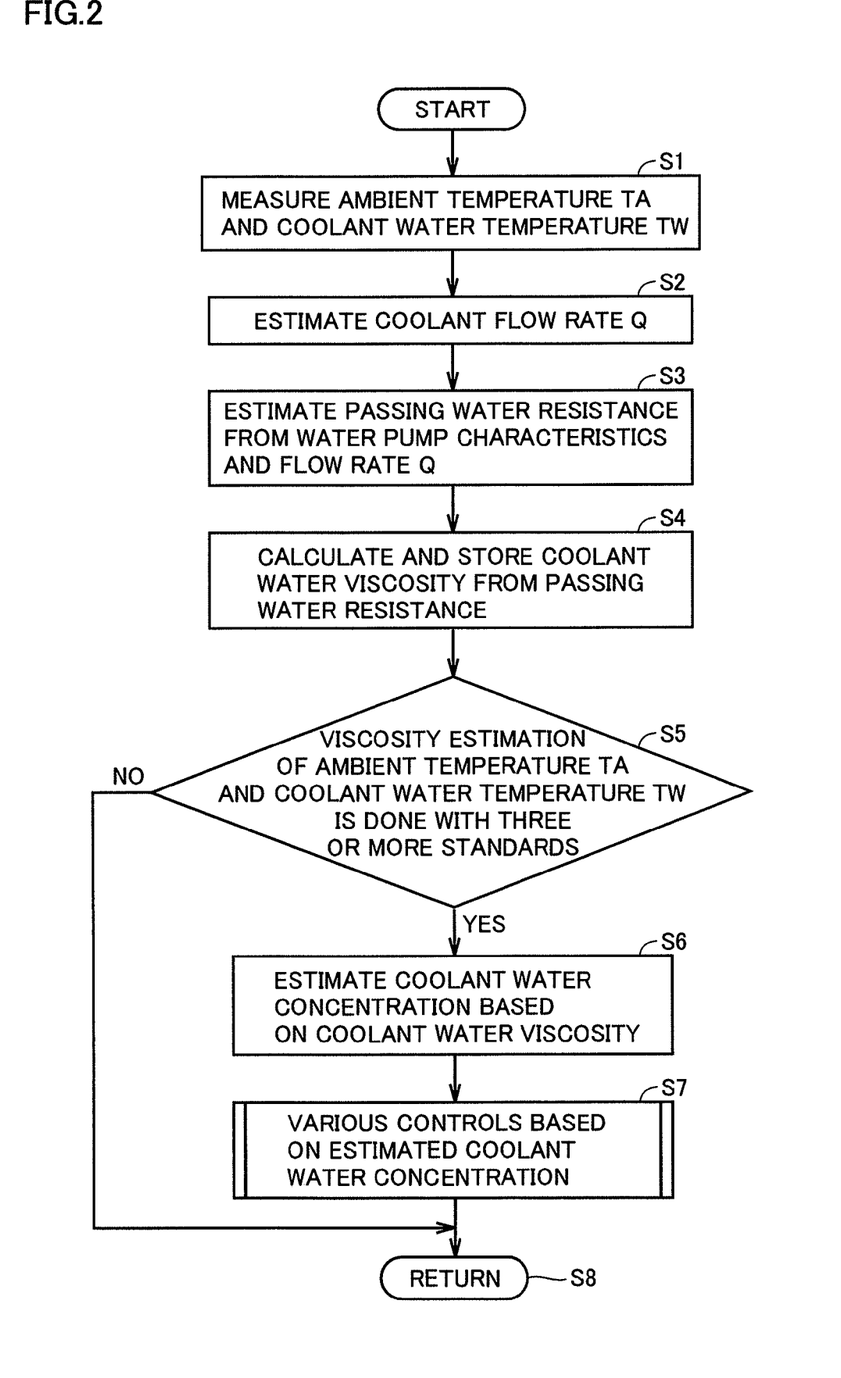
FIG. 2 represents a flowchart for describing that a control device 30 of FIG. 1 estimates a concentration of coolant water and performs various controls based on the estimation.

FIG. 2 represents a flowchart for describing that control device 30 of FIG. 1 estimates a concentration of the coolant water and performs various controls based on the estimation. The processing of this flowchart is invoked from a main routine and executed at each time when a predetermined time period has passed or at each time when a certain condition is met.

Referring to FIGS. 1 and 2, firstly in Step S1, control device 30 measures ambient temperature TA by means of ambient temperature sensor 111, and measures coolant water temperature TW by means of temperature sensor 108.

Subsequently in Step S2, control device 30 estimates a flow rate Q of coolant water flowing through flow passage 116. For example, two kinds of methods can be used as methods for estimating flow rate Q.

Figure 3:
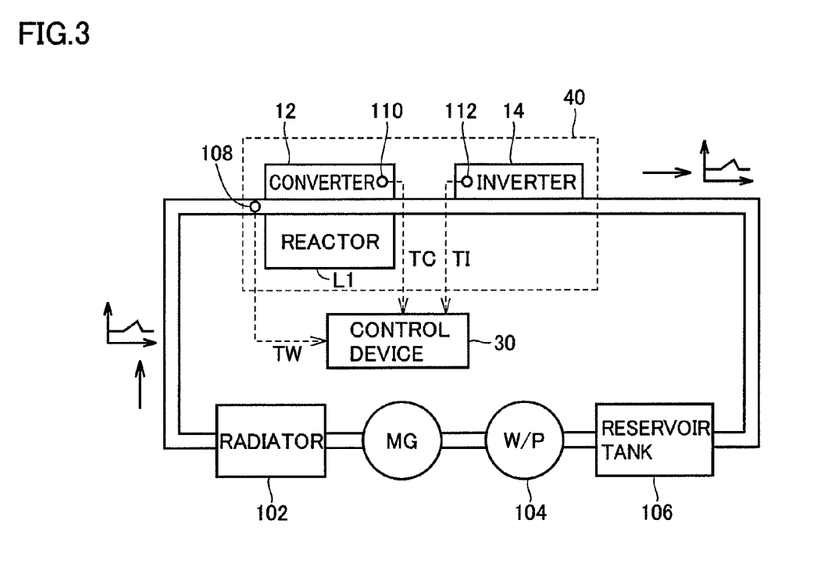
FIG. 3 is a drawing for describing a principle of estimating a flow rate in accordance with a first method used in the present embodiment.

FIG. 3 is a drawing for describing a principle of estimating a flow rate in accordance with a first method used in the present embodiment.

FIG. 3 shows the configuration of the coolant system extracted from the configuration of vehicle 100 of FIG. 1. Radiator 102, PCU 40, reservoir tank 106, water pump 104, and motor generator MG are connected in series and in a circular pattern by a water passing passage. Water pump 104 circulates the coolant water in the direction of the illustrated arrow.

Near the coolant water inlet of PCU 40, temperature sensor 108 for measuring a coolant water temperature is provided. Coolant water temperature TW is transmitted from temperature sensor 108 to control device 30. Further, temperature sensor 110 for detecting temperature TC of voltage converter 12 and temperature sensor 112 for detecting temperature TI of inverter 14 are provided in PCU 40. A temperature detecting element and the like provided in the intelligent power module are employed as temperature sensors 110, 112.

Figure 4:
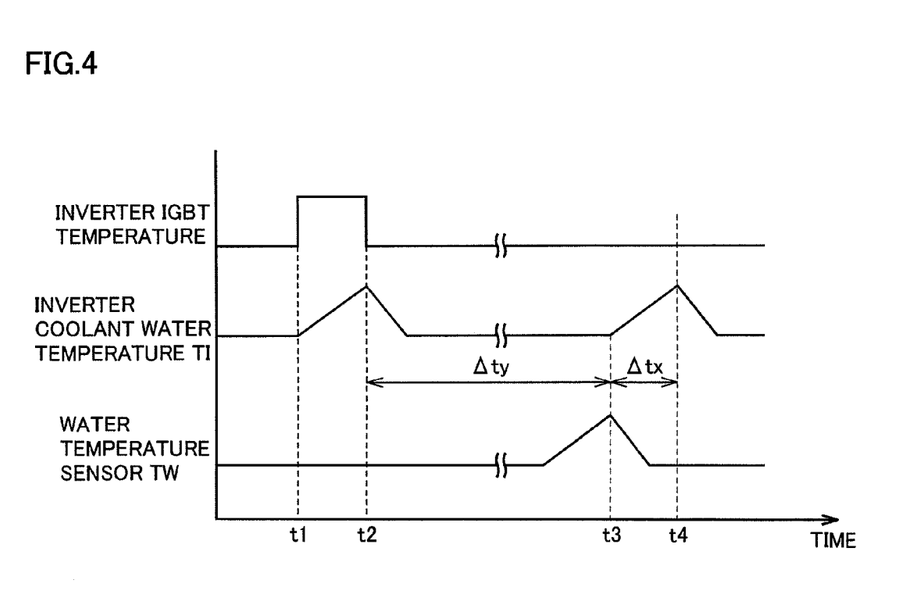
FIG. 4 represents an operation waveform diagram for describing a control related to a flow rate estimation.

FIG. 4 represents an operation waveform diagram for describing a control related to a flow rate estimation.

Referring to FIGS. 3 and 4, control device 30 controls converter 12 or inverter 14 so as to temporarily increase a heat radiation amount in converter 12 or inverter 14 when the operation state of the vehicle tolerates. FIG. 4 shows the case where the temperature of IGBT included in inverter 14 rises in a pulse-like form.

Then, temperature TI of coolant water passing through inverter 14 rises during the period of high heat radiation at IGBT (t1-t2), and thereafter is lowered to the original temperature. The coolant water heated in a pulse-like form is pushed into the water passing passage from PCU 40 at a speed associated with a flow rate of the pump.

In the following, the coolant water heated in the pulse-like form will be referred to as "thermal pulse." The thermal pulse passes through reservoir tank 106, water pump 104, motor generator MG, and radiator 102, and reaches temperature sensor 108 at time t3, so that the thermal pulse is detected. Then, the thermal pulse is detected also at the temperature sensor of inverter 14 at time t4.

Time Δtx for propagation of the thermal pulse in PCU 40 from temperature sensor 108 to temperature sensor 112 of inverter 14, or time Δty for propagation of the thermal pulse through the entire coolant system from temperature sensor 112 to temperature sensor 108 is used for finding a flow velocity and/or a flow rate.

Since a distance between the temperature sensors is constant, control device 30 can find a flow velocity when propagation time Δty and/or Δtx of the thermal pulse is detected. Further, since the flow rate is found by flow speed×flow passage sectional area, and the flow passage sectional area is constant (known constant), the flow rate can be found when propagation time Δty and/or Δtx is known. A relationship between the propagation time of the thermal pulse and the flow rate may be experimentally found and mapped in advance.

Figure 5:
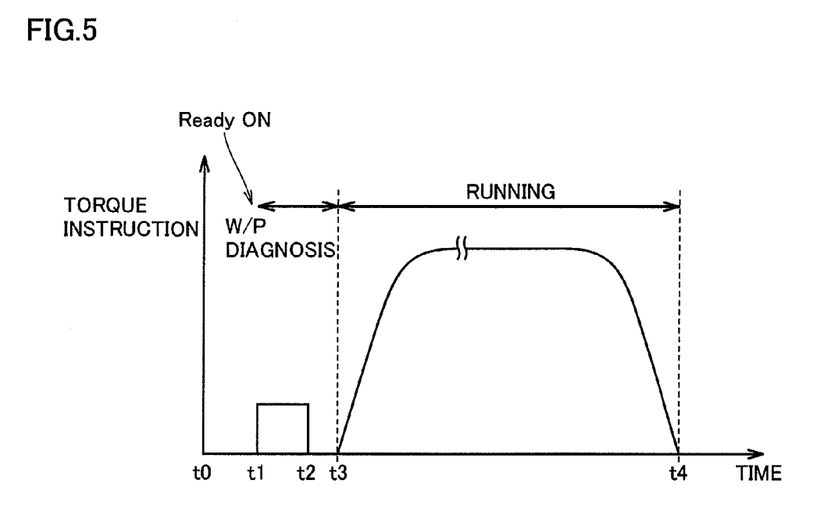
FIG. 5 is a drawing for describing the principle of estimating a flow rate in accordance with the first method used in the first embodiment.

FIG. 5 is a drawing for describing a principle of estimating a flow rate in accordance with the first method used in the present embodiment. In FIG. 5, a diagnosis period for the water pump of the coolant system is described with a waveform diagram.

Referring to FIGS. 1 and 5, when an activation instruction is given by a driver using a start button or the like of the vehicle, the vehicle completes a self-check of an ECU and attains a Ready-ON state. Thereafter, in the state where the vehicle is set in the parking range during time t1-t2, control device 30 outputs a torque instruction to inverter 14 for a short period of time. This torque instruction is smaller as compared to the torque instruction during running on or after time t3. Therefore, when the vehicle is in the parking range, and an accelerator pedal is not stepped, a torque causing movement of the vehicle does not occur.

This torque instruction for a short period of time is adapted to cause a power control element (such as IGBT element) of the inverter to generate heat. Therefore, the instruction does not have to cause occurrence of torque. For example, to prevent occurrence of the torque, inverter 14 may be controlled so as to allow only the d-axis current of the inverter to flow without allowing the q-axis current to flow.

Then, when the diagnosis of the operation state of water pump 104 is completed by time t3, and the normal operation state is confirmed, the torque instruction is generated in accordance with an instruction of acceleration or deceleration given from an acceleration pedal as shown in time t3-t4, so that the vehicle is shifted to the state of being able to run. Time t3 may be defined as the Ready-ON state.

Figure 6:
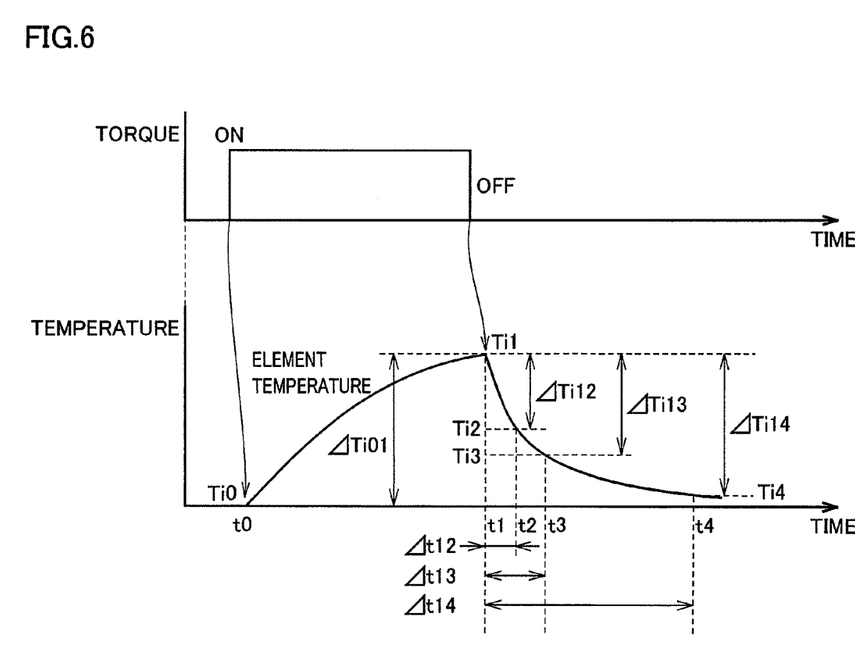
FIG. 6 is a drawing for describing measurement of a falling rate of a temperature used for estimation of a flow rate.

FIG. 6 is a drawing for describing measurement of a falling rate of the temperature used for estimation of a flow rate.

Referring to FIGS. 1 and 6, in response to setting the torque instruction of inverter 14 to attain the ON state, the temperature of power control element Q4 of the inverter starts rising at time t0. Then, until the torque instruction of inverter 14 is set to attain the OFF state, the element temperature continues to rise. The element temperature takes a peak value Ti1 at time t1 corresponding to setting of the torque instruction of the inverter to attain the OFF state. This peak value Ti1 and time t1 at that moment are stored in an internal memory or the like of control device 30.

Next, a differential value ΔTi01 between peak temperature Ti1 and a present inverter element temperature Ti0 is calculated based on the following equation (1).

$$\Delta Ti01 = Ti1 - Ti0 \quad (1)$$

Control device 30 determines a calculated temperature of a falling rate of the temperature of the power control element in the inverter. When it is provided that the difference of the calculated temperatures for calculating a falling rate of the temperature of the power control element in the inverter corresponding to a value "n" is ΔTi1n, the following equation (2) is established.

$$\Delta Ti1n = \Delta Ti01 * (n-1)/n \quad (2)$$

For example, if n=2, ΔTi12=ΔTi01*½ can be developed, and the first measurement is made when the temperature difference is lowered to a half. If n=3, the measurement is made when the temperature difference is lowered to ⅓.

Next, it is determined whether or not the present temperature has fallen to a temperature Tin expressed by the following equation (3).

$$Tin = Ti1 - \Delta Ti1n \quad (3)$$

When the calculated temperature differences ΔTi12, ΔTi13, ΔTi14 are lowered form peak value Ti1, times t2, t3, t4 are measured. Times t2, t3 can be times at which the temperature differences are ½ and ⅓ of ΔTi01. Further, like time t4, the measurement point may be at the time when the temperature becomes slightly higher (for example, +2° C.) than initial temperature Ti0.

Based on measured time tn and stored time t1, time difference ΔT1n from time t1 is calculated. As shown in FIG. 6, time differences Δt12, Δt13, Δt14 corresponding respectively to temperature differences ΔTi12, ΔTi13, ΔTi14 are calculated. The calculated values are stored in an internal memory of control device 30 or the like.

Figure 7:
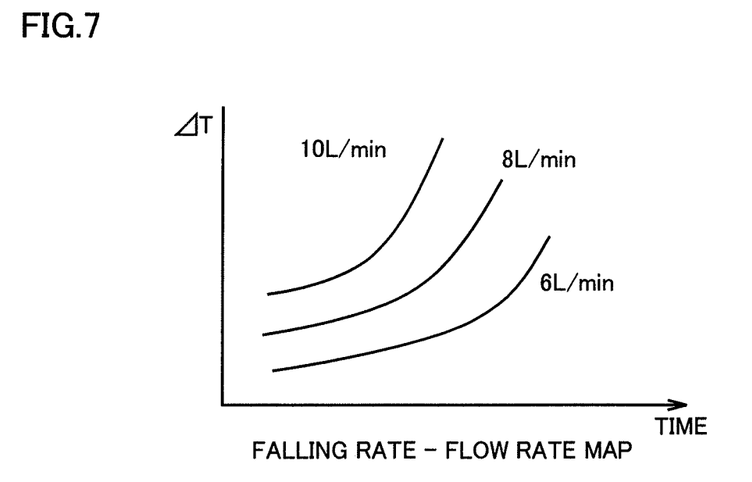
FIG. 7 represents an example of a falling rate flow rate map.

Next, a flow rate is calculated from temperature difference ΔTin and time difference Δtin and a falling rate flow rate map.

FIG. 7 represents an example of a falling rate flow rate map. The falling rate flow rate map of FIG. 7 is different for each coolant system of a vehicle. Therefore, values experimentally calculated in advance are used. The vehicle itself may obtain data when the water pump is normal directly after shipment and inspection, and the data may be used as a reference value. When temperature difference ΔT and corresponding time difference Δt are inputted to the map, corresponding flow rate Qn can be calculated.

Referring back to FIG. 2, when flow rate Q is estimated in Step S2, the water passing resistance of flow passage 116 is estimated from flow rate Q of the water pump characteristics in Step S3.

Figure 8:
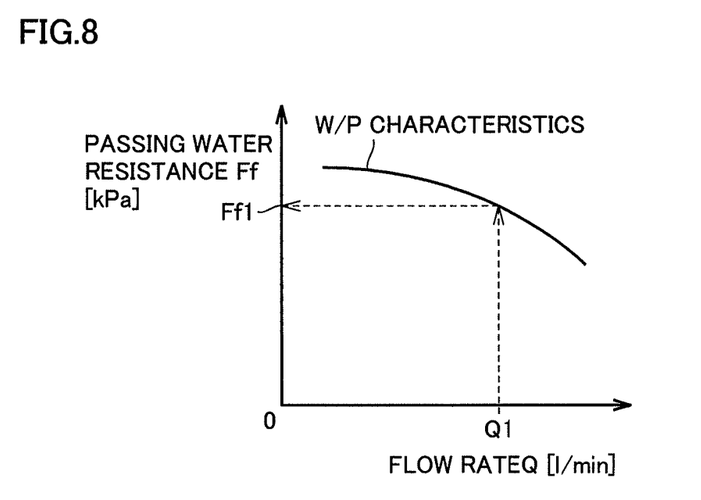
FIG. 8 represents an example of a map for determining a water passing resistance based on a flow rate and water pump characteristics used in Step S3 of FIG. 2.

FIG. 8 represents an example of the map for determining the water passing resistance from the flow rate and water pump characteristics used in Step S3 of FIG. 2.

In FIG. 8, the horizontal axis denotes flow rate Q (l/min), and the vertical axis denotes water passing resistance Ff(kPa). The line indicating the experimentally found water pump characteristics corresponds to the map. When the flow rate is estimated as Q1, the water passing resistance is estimated as Ff1 from this map.

Referring back to FIG. 2, after the water passing resistance is estimated in Step S3, a coolant water viscosity is calculated from the water passing resistance in Step S4. The calculated coolant water viscosity is stored in a memory provided in control device 30 together with ambient temperature TA or coolant water temperature TW at that moment. A general equation of a pipe resistance is expressed by the following equation (4).

$$Ff = 32 \mu Lu / \rho D^2 \quad (4)$$

In the equation described above, "Ff" indicates a water passing resistance, and "μ" indicates a viscosity, and "L" indicates a pipe line length, and "u" indicates a flow velocity, and "D" indicates a pipe line diameter, and "ρ" indicates a density of a liquid medium. Therefore, viscosity μ can be calculated back from the equation.

Next, in Step S5, it is determined whether or not data of viscosity estimation with three or more standards as to ambient temperature TA or coolant water temperature TW is stored. The "three or more standards" means that there are three or more temperature conditions. The number of temperature conditions is desirably plural, and more preferably three or more. As the number of temperature conditions increase, the estimation accuracy improves. In Step S5, when there is no data with three or more standards, the processing proceeds to Step S8, and waits until further data is obtained. On the other hand, in Step S5, when data of viscosity estimation with three or more temperature standards is stored, the processing proceeds to Step S6.

In Step S6, the processing of estimating a coolant water concentration (concentration of antifreeze liquid component in coolant water) is executed based on the coolant water viscosity.

Figure 9:
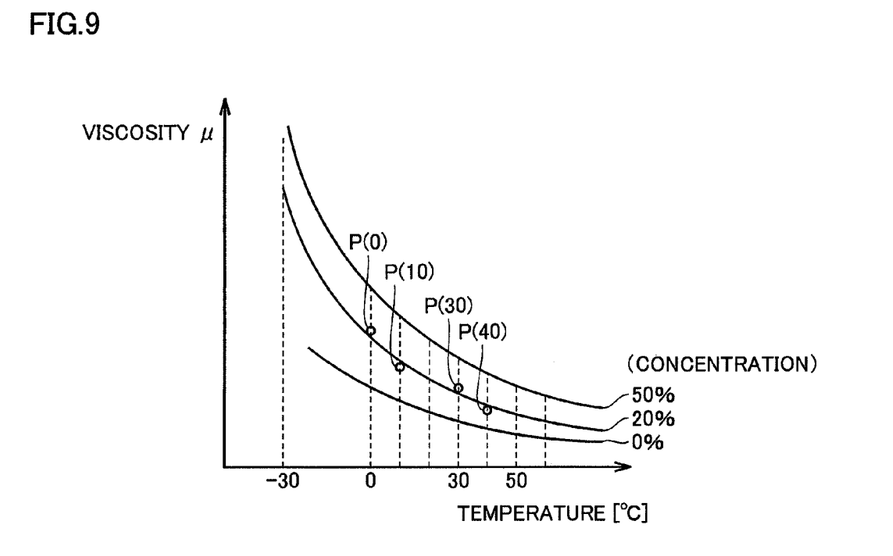
FIG. 9 represents an example of a map for determining a coolant water concentration based on a coolant water viscosity.

FIG. 9 represents an example of a map for determining a coolant water concentration based on a coolant water viscosity. Referring to FIG. 9, viscosity estimation is performed when ambient temperature TA or coolant water temperature TW is at 0° C., 10° C., 30° C., and 40° C., and corresponding viscosities P(0), P(10), P(30), and P(40) are stored. In this case, since four temperature conditions are provided, it corresponds to the several temperature conditions, and also to the three or more conditions. When the temperatures are plotted on the coordinate plane of FIG. 9, it can be found that the plots are closest to the line of 20% concentration. To determine the closeness to each line, for example, the method of selecting a line with a smallest sum of differences between value indicated in map at each temperature and estimated viscosity may be used.

As described above, control device 30 calculates a viscosity of the coolant water based on a flow rate of the coolant water flowing through flow passage 116 and performance of pump 104, and then calculates a concentration of the coolant water based on a relationship between a plurality of temperature conditions and viscosity of corresponding coolant water (map corresponding to the graph showing the change in viscosity at the time of changing the temperature of FIG. 9) when calculation of the viscosity of coolant water is executed with a plurality of temperature conditions.

After the processing of Step S6 in FIG. 6 is terminated, and the concentration of the coolant water is estimated, various controls based on the estimated coolant water concentration are executed in Step S7, and thereafter the control is returned to the main routine in Step S8.

Figure 10:
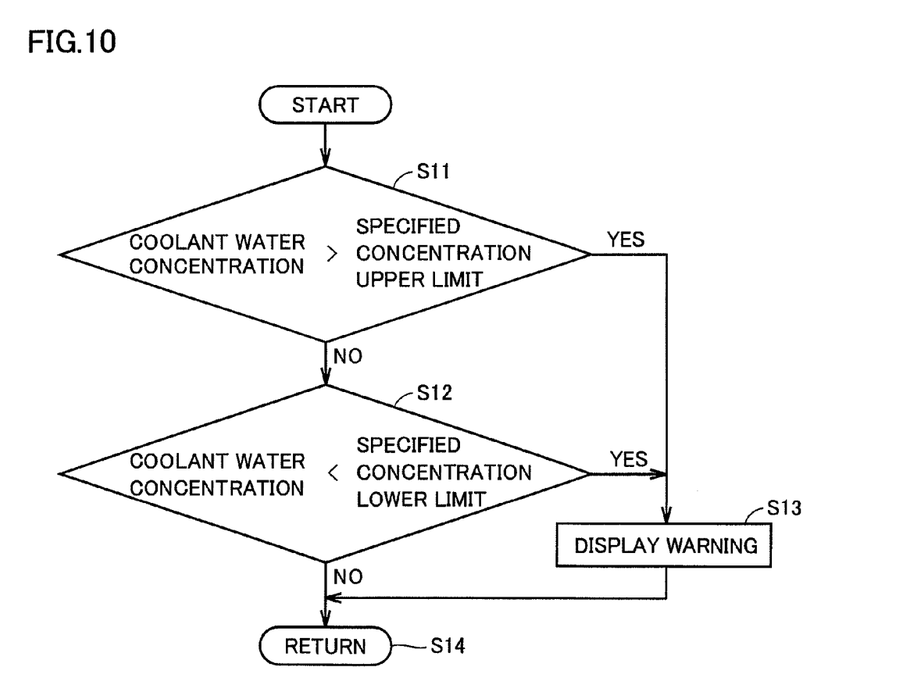
FIG. 10 represents a flowchart for describing a first example of a control executed in Step S7 of FIG. 2.

FIG. 10 represents a flowchart for describing a first example of the controls executed in Step S7 in FIG. 2.

Referring to FIG. 10, when the processing is started, in Step S11, it is determined whether or not the obtained coolant water concentration is higher (more concentrated) than a specified concentration upper limit value of a coolant water specified by a vehicle manufacturer. In the case of coolant water concentration>specified concentration upper limit, warning which can be noticed by a user is displayed in Step S13. In Step S11, when coolant water concentration>specified concentration upper limit is not satisfied, the processing proceeds to Step S12.

In Step S12, it is determined whether or not the coolant water concentration is lower (less concentrated) than a specified concentration lower limit value of the coolant water specified by a vehicle manufacturer. In the case of coolant water concentration<specified concentration lower limit, warning which can be noticed by a user is displayed in Step S13. In Step S12, when coolant water concentration<specified concentration lower limit is not satisfied, the processing proceeds to Step S14, and the control is shifted to the main routine.

Figure 11:
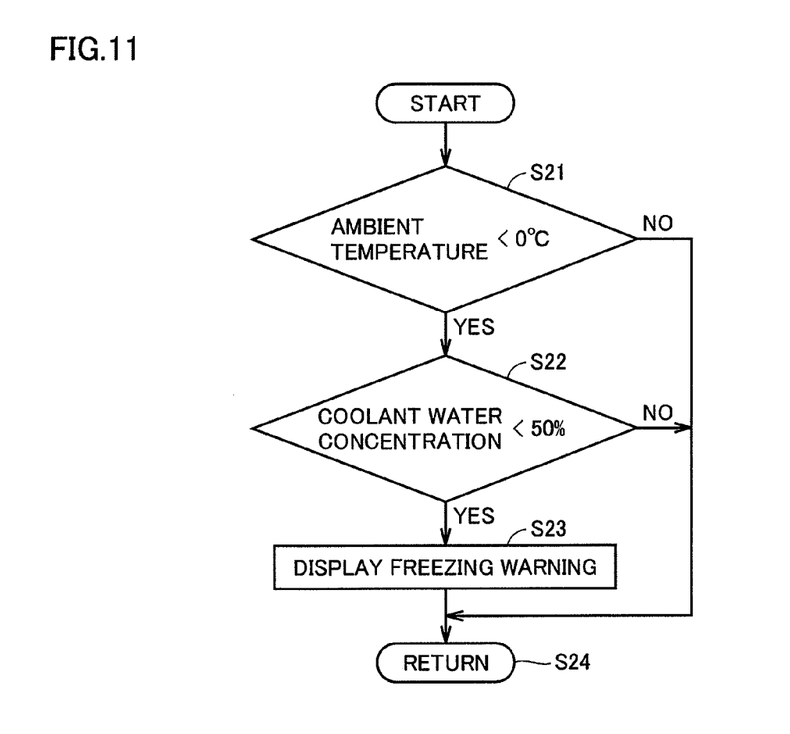
FIG. 11 represents a flowchart for describing a second example of the control executed in Step S7 of FIG. 2.

FIG. 11 represents a flowchart for describing a second example of the control executed in Step S7 of FIG. 2.

Referring to FIG. 11, when the processing is started, it is determined whether or not ambient temperature TA<0° C. is satisfied in Step S21. When ambient temperature TA<0° C. is satisfied in Step S21, it is determined whether or not coolant water concentration<50° C. is satisfied in Step S22. As the coolant water concentration is low (less concentrated), the coolant water becomes more likely to freeze. When the coolant water concentration<50% is satisfied in Step S22, the processing proceeds to Step S23, and warning with respect to freezing is displayed so that the user can notice. Thereafter, the processing proceeds to Step S24, and the control is returned to the main routine.

On the other hand, when ambient temperature TA<0° C. is not satisfied in Step S21, or when coolant water concentration<50% is not satisfied in Step S22, the processing proceeds to Step S24 without displaying warning, and the control is returned to the main routine.

As an example of the threshold value of ambient temperature TA, 0° C. was described. As an example of the threshold value of coolant water concentration, 50% was described. However, these threshold values can be changed suitably.

Figure 12:
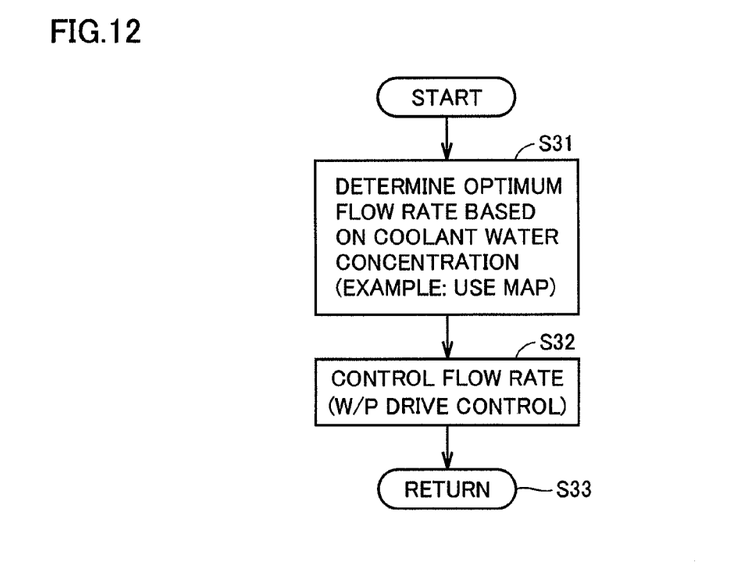
FIG. 12 represents a flowchart for describing a third example of the control executed in Step S7 of FIG. 2.

FIG. 12 represents a flowchart for describing a third example of a control executed in Step S7 of FIG. 2.

Referring to FIG. 12, when the processing is started, an optimum flow rate is determined based on the coolant water concentration in Step S31. For example, the optimum flow rate corresponding to each coolant concentration is defined in advance by the map. Then, in Step S32, driving of the water pump is controlled so that the optimum flow rate flows into the flow passage to perform the flow rate control.

Figure 13:
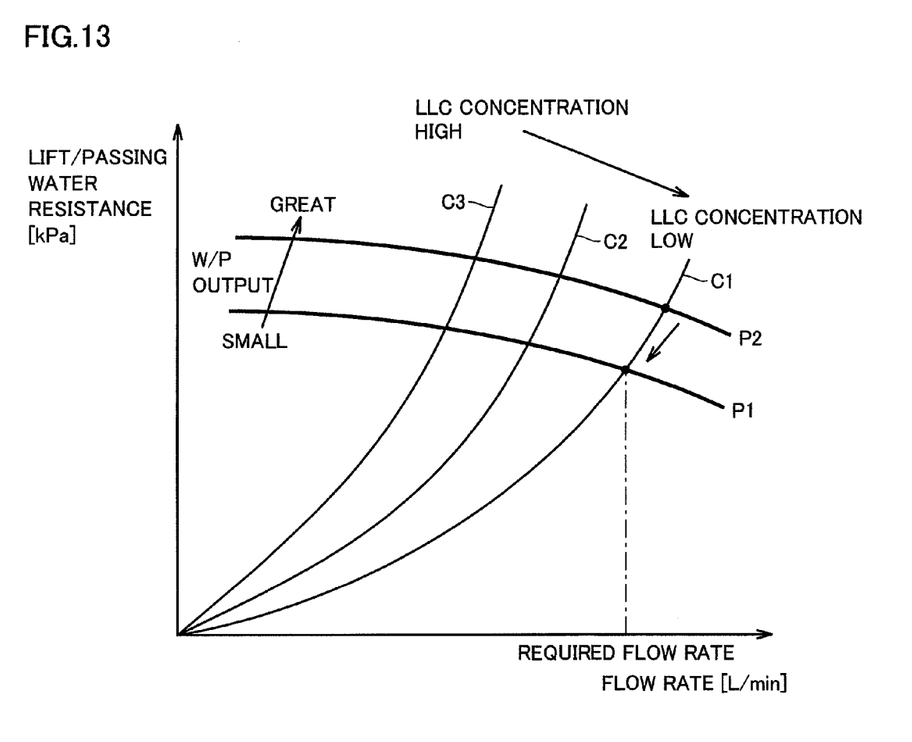
FIG. 13 is a drawing for describing a flow rate control of Step S32 in the flowchart of FIG. 12.

FIG. 13 is a drawing for describing a flow rate control of Step S32 in the flowchart of FIG. 12.

In FIG. 13, the coolant water concentration is displayed as an LLC concentration. Then, since the coolant water concentration is estimated, it is clarified which of the lines C1-C3 corresponds to the relationship between the water passing resistance and the flow rate. Further, the optimum flow rate determined in Step S31 of FIG. 12 is shown as a required flow rate.

The operation point can be switched as indicated by lines P1, P2 by changing a water pump output. In the example of FIG. 13, when the estimated concentration is the value corresponding to line C1, the present water pump flow rate is a value corresponding to line P2.

Then, the present flow rate becomes a flow rate determined at a cross point between line C1 and line C2. However, since this flow rate is too large with respect to the necessary flow rate, an energy loss occurs.

In view of the above, to allow matching of a required flow rate with a present flow rate, the output of the water pump is switched from the great output corresponding to line P1 to the small output corresponding to line P2.

Accordingly, reduction of the flow rate causes optimum flow rate to pass through the flow passage, so that energy efficiency is improved.

It is to be understood that the embodiments disclosed herein are only by way of example, and not to be taken by way of limitation. The scope of the present invention is not limited by the description above but rather by the terms of the appended claims, and is intended to include any modification within the scope and meaning equivalent to the terms of the claims.

REFERENCE SIGNS LIST 2 wheels; 10, 13 voltage sensor; 12 voltage converter; 14 inverter; 24 current sensor; 30 control device; 100 vehicle; 102 radiator; 104 water pump; 106 reservoir tank; 108, 110, 110, 112, 112 temperature sensor; 111 ambient temperature sensor; 116 flow passage; B battery; C0, C1 smoothing capacitor; D1-D8 diode; L1 reactor; MG motor generator; PL1, PL2 positive electrode bus line; Q1-Q8 power control element; SL1, SL2 negative electrode bus line; SMRB, SMRG, SMRB, SMRG system main relay.

The invention claimed is:

1. A diagnosing device for a vehicle having a flow passage for circulating a liquid medium for cooling an inverter of the vehicle, and a pump provided on said flow passage to circulate said liquid medium, the diagnosing device comprising:
a temperature sensor for measuring a temperature related to a temperature of said liquid medium; and
a calculating unit for calculating a concentration of said liquid medium, wherein
said calculating unit calculates a viscosity of said liquid medium based on a flow rate of said liquid medium flowing through said flow passage and performance of said pump, and when the calculation as to the viscosity of said liquid medium is executed under a plurality of temperature conditions, said calculating unit calculates the concentration of said liquid medium based on a relationship between the plurality of temperature conditions and the viscosity of the liquid medium.

2. The diagnosing device for a vehicle according to claim 1, wherein said calculating unit performs driving of said pump based on the calculated concentration of said liquid medium.

3. The diagnosing device for a vehicle according to claim 1, further comprising an ambient temperature sensor for measuring an ambient temperature,
   said calculating unit outputs a warning when the calculated concentration of said liquid medium is included within a freezing concentration range corresponding to said ambient temperature.

4. The diagnosing device for a vehicle according to claim 1, wherein said calculating unit outputs a warning when the calculated concentration of said liquid medium is not included within the concentration range of a specified liquid medium.

5. A method for diagnosing a vehicle having a flow passage for circulating a liquid medium for cooling an inverter of the vehicle, and a pump provided on said flow passage to circulate said liquid medium, the method comprising the steps of:
   measuring a temperature related to a temperature of said liquid medium;
   calculating a viscosity of said liquid medium based on a flow rate of said liquid medium flowing through said flow passage and performance of said pump; and
   calculating a concentration of said liquid medium based on a relationship between a plurality of temperature conditions and corresponding viscosity of said liquid medium when calculation of the viscosity of said liquid medium is performed under the plurality of temperature conditions.

* * * * *